(12) United States Patent
Morrissette

(10) Patent No.: US 10,893,013 B1
(45) Date of Patent: Jan. 12, 2021

(54) RECIPIENT NOTIFICATION OF ELECTRONIC MESSAGE GENERATED BY VOICE-TO-TEXT ENGINE

(71) Applicant: James Peter Morrissette, Fort Myers, FL (US)

(72) Inventor: James Peter Morrissette, Fort Myers, FL (US)

( * ) Notice: Subject to any disclaimer, the term of this patent is extended or adjusted under 35 U.S.C. 154(b) by 369 days.

(21) Appl. No.: 15/682,853

(22) Filed: Aug. 22, 2017

(51) Int. Cl.
*H04L 12/58* (2006.01)

(52) U.S. Cl.
CPC ............................ *H04L 51/24* (2013.01)

(58) Field of Classification Search
CPC ................................. H04B 1/38; H04L 51/24
USPC .......................................... 455/566; 704/235
See application file for complete search history.

(56) References Cited

U.S. PATENT DOCUMENTS

| | | | | |
|---|---|---|---|---|
| 6,313,734 B1* | 11/2001 | Weiss | .................. | H04W 88/023 340/7.29 |
| 8,382,480 B2* | 2/2013 | Bucchieri | ............ | G09B 21/003 340/407.1 |
| 8,699,677 B2* | 4/2014 | Zhou | ...................... | H04M 11/10 379/88.14 |
| 8,781,080 B2* | 7/2014 | Hale | ................. | H04M 3/42221 340/540 |
| 9,270,828 B2* | 2/2016 | Jackson | ................ | H04M 3/533 |
| 2007/0293272 A1* | 12/2007 | Salmon | ............... | H04M 1/7255 455/566 |
| 2009/0223502 A1* | 9/2009 | Bach | ..................... | F41B 5/1426 124/87 |
| 2009/0249244 A1* | 10/2009 | Robinson | .............. | G06F 3/0481 715/781 |
| 2011/0183725 A1* | 7/2011 | Cohen | ..................... | G10L 13/00 455/569.1 |
| 2012/0315607 A1* | 12/2012 | Shin | ...................... | G06F 3/0488 434/114 |
| 2013/0072237 A1* | 3/2013 | Ramdeo | .............. | H04M 1/7255 455/466 |
| 2016/0018890 A1* | 1/2016 | Deokar | ................... | G06F 3/016 715/702 |
| 2016/0018920 A1* | 1/2016 | Deokar | ................... | G06F 3/044 345/174 |
| 2016/0019817 A1* | 1/2016 | Deokar | ................... | G08B 6/00 340/4.12 |

\* cited by examiner

*Primary Examiner* — Albert K Wong
(74) *Attorney, Agent, or Firm* — George F. Wallace

(57) ABSTRACT

Notifying a recipient of an electronic message that the message was produced via a voice-to-text engine can include accessing text data produced by the voice-to-text engine; adding at least one symbol to the text data to form the electronic message; and providing the electronic message to a messaging engine that sends the electronic message to the recipient, who is notified by the at least one symbol that the electronic message was produced via the voice-to-text engine. The at least one symbol can be added to at least one of the head of the text data, the tail of the text data, and a position within the text data. A symbol can be any combination of ASCII, GSM 03.38, Unicode, and HTTP encoding symbols. A messaging engine can send electronic messages as SMS, MMS, or E-Mail messages.

18 Claims, 3 Drawing Sheets

RECIPIENT NOTIFICATION OF ELECTRONIC MESSAGE GENERATED BY VOICE-TO-TEXT ENGINE

FIELD OF THE INVENTION

The present invention relates to electronic messages, and more specifically, to electronic messages generated by voice-to-text engines.

SUMMARY OF THE INVENTION

It is an object of the present invention to provide a method of notifying a recipient of an electronic message that the message was produced via a voice-to-text engine.

In an exemplary embodiment of the present invention, a method of notifying a recipient of an electronic message that the message was produced via a voice-to-text engine can include accessing text data produced by the voice-to-text engine; adding at least one symbol to the text data to form the electronic message; and providing the electronic message to a messaging engine.

In an exemplary aspect of the present invention, the messaging engine can send the electronic message to the recipient, and the at least one symbol can provide notification to the recipient that the electronic message was produced via the voice-to-text engine.

In further exemplary aspects, the step of adding can include adding the at least one symbol to the head of the text data, to the tail of the text data, or within the text data.

In additional exemplary aspects, the at least one symbol can include at least one of an ASCII, a GSM 03.38, a Unicode symbol, and HTTP encoding data.

In yet further exemplary aspects, the messaging engine can send the electronic message as a SMS message, an MMS message, or an electronic mail message.

These and other exemplary aspects and embodiments of the present invention are further described herein.

DETAILED DESCRIPTION

It should be noted that this disclosure includes a plurality of embodiments each having a plurality of elements and/or aspects, and such elements and/or aspects need not necessarily be interpreted as being conjunctively required by one or more embodiments of the present invention. Rather, all combinations of the one or more elements and/or aspects can enable a separate embodiment of the present invention, which may be claimed with particularity in this or any one or more future filed Non-Provisional Patent Applications. Moreover, any particular elements and/or aspects disclosed herein, whether expressly or implicitly, are to be construed strictly as illustrative and enabling, and not necessarily limiting. Therefore, it is expressly set forth that such elements and/or ranges, independently or in any combination of one of more thereof, are merely illustratively representative of one or more embodiments of the present invention and are not to be construed as necessary in a strict sense.

Further, to the extent the same element and/or aspect is defined differently within this or any related disclosure, whether expressly or implicitly, the broader definition is to take absolute precedence, with the distinctions encompassed by the narrower definition to be strictly construed as optional.

Illustratively, perceived benefits of the present invention can include functional utility, including the notifying of a recipient of an electronic message based on text data that was produced via a voice-to-text engine, whether expressly or implicitly stated herein, or apparent herefrom. However, it is expressly set forth that these benefits are not intended as exclusive. Therefore, any explicit, implicit, apparent, or synergistic benefit from the disclosure herein is expressly deemed as applicable to the present invention.

In one type of circumstance, text data produced by voice-to-text engines can include errors, which can convey incorrect information. Such errors can arise from pronunciation variations and errors, background noise, logic errors, etc. The present invention reduces the impact of such errors by providing recipients of such text data with notice that a voice-to-text engine was utilized, so the recipients will understand that the potential for such errors exists.

According to the present invention, a method of notifying a recipient of an electronic message that the message was produced via a voice-to-text engine can be effectuated via computer software executing on any type of computer, including, but not limited to, a smartphone, tablet, laptop, or desktop computer, for example and not in limitation. Further, such software can be compatibly provided for use with any desired operating system, such as WINDOWS, LINUX, ANDROID, IOS, or any other desired operating system.

Figure 1:
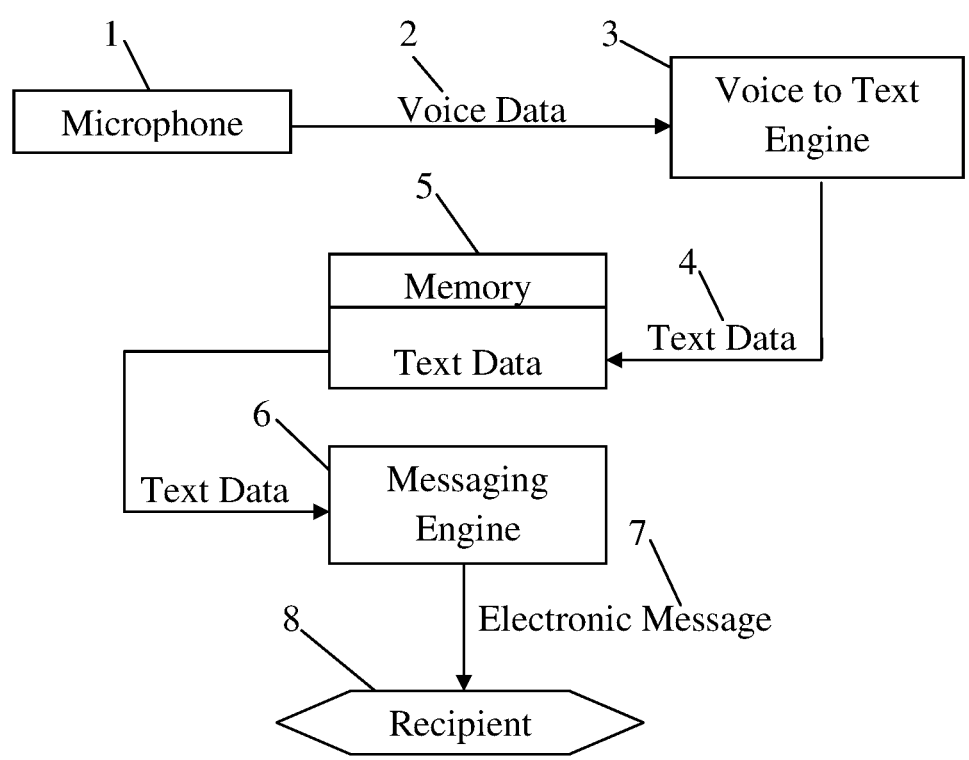
FIG. 1 illustrates an exemplary environment of the present invention, in which a voice-to-text engine converts voice data captured by a microphone to text data which is provided to a messaging engine, which sends an electronic message based on the text data to a recipient.

FIG. 1 illustrates an exemplary environment of the present invention, in which a microphone 1 sends voice data 2 to a voice-to-text engine 3, which converts the voice data to text data 4 corresponding to the voice data, and stores the text data in a computer memory 5. Further, messaging engine 6 would form an electronic message 7 based on text data 4, and send the electronic message to a recipient 8 via a computer network (not shown), such as the Internet, a computer network, or a telephone network, as an E-mail, an SMS (Short Message Service) message, an MMS (Multimedia Messaging Service) message, or other type of message.

The present invention provides an additional component that modifies text data 4, which provide notice to a recipient that an electronic message 7 was derived via a voice-to-text engine 3, such that the recipient will be aware of potential derivation errors arising therefrom.

Figure 2:
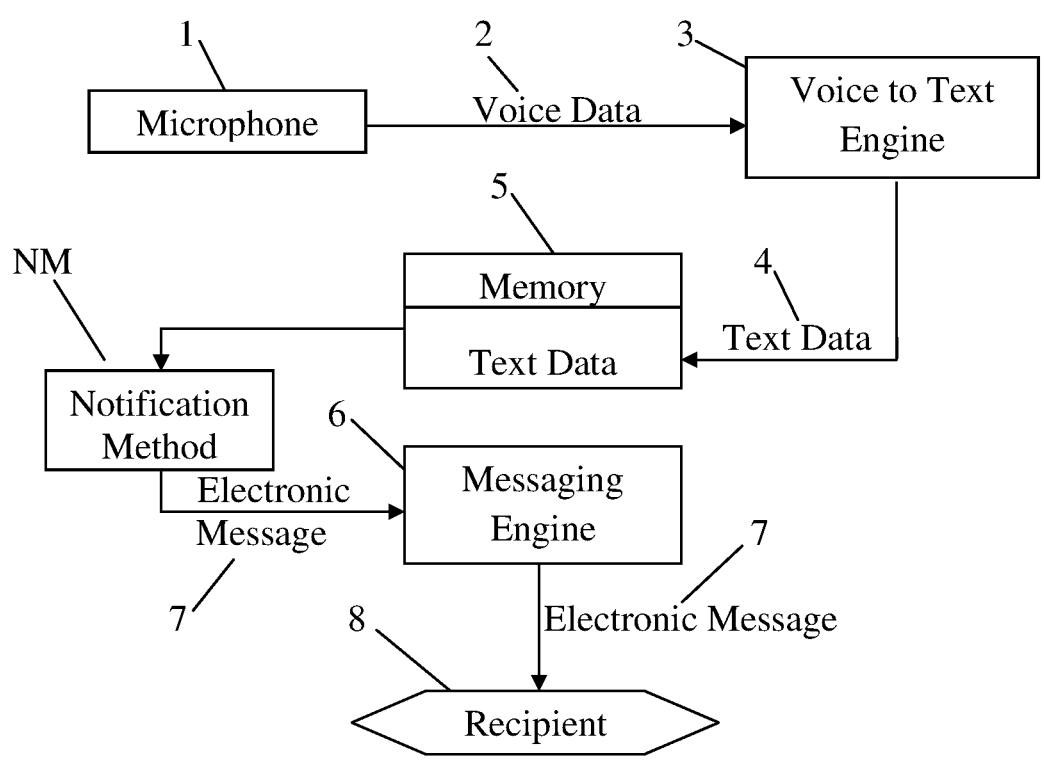
FIG. 2 illustrates an exemplary application of the present invention to an exemplary environment.

FIG. 2 illustrates an exemplary integration of the present invention within an exemplary environment, in which a notification method NM can be communicatively connected to memory 5 in which text data 4 is stored and to messaging engine 6.

Figure 3:
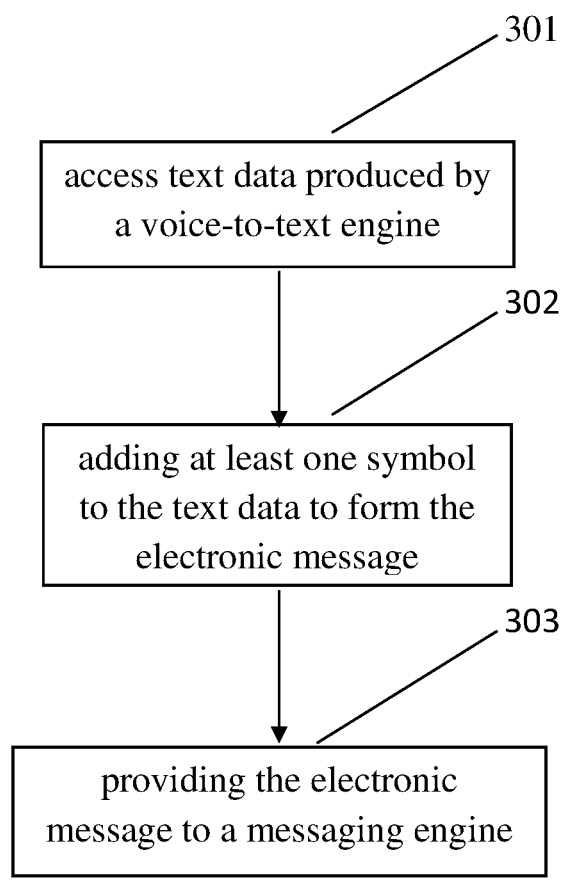
FIG. 3 illustrates an exemplary embodiment of the present invention, in which a method can access text data produced by a voice-to-text engine, add at least one symbol to the text data to form an electronic message, and provide the electronic message to a messaging engine.

FIG. 3 illustrates an exemplary embodiment of the present invention, in which a method of notifying a recipient 8 of an electronic message 7 that the message was produced via a voice-to-text engine 3 can include the following steps: accessing text data 4 produced by the voice-to-text engine (Step 301); adding at least one symbol (described infra) to the text data to form the electronic message (Step 302); and providing the electronic message to a messaging engine (Step 303), which can send the electronic message to the recipient. Notably, the present invention can be provided as a separate component that cooperatively functions with a pre-existing messaging engine 6 or can be integrated within a messaging engine.

In an exemplary aspect of the invention, any method according to the present invention can be implemented in any combination of software, firmware, and hardware, insofar as the same is functionally compatible with the present invention as described and/or claimed.

In another exemplary aspect, in reference to Step 301, text data 4 can be stored in any desired functionally compatible computer memory, such as Random Access Memory or Flash Memory, for example and not in limitation.

In a further exemplary aspect, in reference to Step 302, the at least one symbol can be added to text data 4 by one or more of concatenation to the head and/or tail of the text data, insertion within the text data, or by any other manner consistent with a particular messaging and/or symbol protocol or format utilized, such as, for example and not in limitation, within the subject field of an E-mail. Further, any symbol or symbols that can be compatibly transmitted via the particular service or messaging protocol utilized by messaging engine 6 can be used. For example and not in limitation, such a symbol or symbols can be based on one or more of the American Standard Code of Information Interchange ("ASCII"), GSM 03.38, Unicode, HTTP Encoding, or any other desired symbol set, definition, or format, including custom symbols, insofar as the same is functionally compatible with the messaging protocol utilized. Notably, an added symbol or symbols can be perceived by a recipient via visual, audible, or tactile perception; and further, such perception can be direct (e.g., visually perceiving the symbol(s)) or indirectly (a recipient's corresponding messaging engine can interpret added symbol or symbols and notifyingly provide a visual, audible, or tactile notification, for example and not in limitation.

In yet another exemplary aspect, in reference to Step 303, upon addition of the at least one symbol to text data 4, which forms electronic message 7, the electronic message is provide to messaging engine 6, which can communicate to a recipient, such that notification can be effectuated.

It will be apparent to one of ordinary skill in the art that the manner of making and using the claimed invention has been adequately disclosed in the above-written description of the exemplary embodiments and aspects.

It should be understood, however, that the invention is not necessarily limited to the specific embodiments, aspects, arrangement, and components shown and described above, but may be susceptible to numerous variations within the scope of the invention. Therefore, the specification and drawings are to be regarded in an illustrative and enabling, rather than a restrictive, sense.

Accordingly, it will be understood that the above description of the embodiments of the present invention are susceptible to various modifications, changes, and adaptations, and the same are intended to be comprehended within the meaning and range of equivalents of the appended claims.

Therefore, I claim:

1. A method of notifying a recipient of an electronic message that the message was produced via a voice-to-text engine, said method comprising:

accessing text output data produced by the voice-to-text engine;

adding at least one voice-to-text notification symbol to the text output data to form the electronic message; and after said step of adding, providing the electronic message to a messaging engine;

wherein the messaging engine sends the electronic message via a communication network to the recipient, and the at least one symbol perceptively indicates to the recipient that the electronic message was produced via the voice-to-text engine and is transcription error prone.

2. The method of claim 1, wherein said step of adding includes adding the at least one symbol to a head of the text output data.

3. The method of claim 1, wherein the at least one symbol includes at least one of an ASCII, a GSM 03.38, and a Unicode symbol.

4. The method of claim 1, wherein the at least one symbol includes HTTP encoding data.

5. The method of claim 1, wherein the messaging engine sends the electronic message as a SMS message.

6. The method of claim 1, wherein the messaging engine sends the electronic message as an email.

7. The method of claim 1, wherein the messaging engine sends the electronic message as an MMS message.

8. The method of claim 1, wherein said step of adding is executed before said step of providing.

9. The method of claim 8, wherein the messaging engine sends the electronic message as one of a short message service message and a multimedia messaging service message.

10. The method of claim 1, wherein the messaging engine sends the electronic message as one of a short message service message and a multimedia messaging service message.

11. The method of claim 1, wherein the at least one symbol includes a symbol having a sole purpose of indicating to the recipient that the electronic message was produced via the text-to-voice engine.

12. The method of claim 1, wherein the at least one symbol includes a symbol that is unrelated to identifying information of the text output data.

13. The method of claim 1, wherein the text output data includes data corresponding to voice data, and the at least one symbol includes a symbol that is unrelated to identifying information of the voice data.

14. The method of claim 1, wherein the at least one symbol is perceivable by the recipient via visual perception.

15. The method of claim 1, wherein the at least one symbol is perceivable by the recipient via audible perception.

16. The method of claim 1, wherein the at least one symbol is perceivable by the recipient via tactile perception.

17. The method of claim 1, wherein said step of adding includes adding the at least one symbol to a tail of the text output data.

18. The method of claim 1, wherein said step of adding includes adding the at least one symbol to a position within the text output data.

* * * * *